US010592329B2

(12) United States Patent
Chen

(10) Patent No.: US 10,592,329 B2
(45) Date of Patent: Mar. 17, 2020

(54) METHOD AND ELECTRONIC DEVICE FOR CONTINUING EXECUTING PROCEDURE BEING ABORTED FROM PHYSICAL ADDRESS WHERE ERROR OCCURS

(71) Applicant: Acer Incorporated, New Taipei (TW)

(72) Inventor: Kuan-Ju Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 105 days.

(21) Appl. No.: 15/693,482

(22) Filed: Sep. 1, 2017

(65) Prior Publication Data
US 2018/0253349 A1 Sep. 6, 2018

(30) Foreign Application Priority Data

Mar. 2, 2017 (TW) .............................. 106106866 A
Jun. 22, 2017 (TW) .............................. 106120858 A

(51) Int. Cl.
*G06F 11/00* (2006.01)
*G06F 11/07* (2006.01)
(52) U.S. Cl.
CPC ........ *G06F 11/0793* (2013.01); *G06F 11/079* (2013.01); *G06F 11/0751* (2013.01)
(58) Field of Classification Search
CPC ............. G06F 11/0793; G06F 11/0712; G06F 11/0703; G06F 11/0706; G06F 11/0718
See application file for complete search history.

(56) References Cited

U.S. PATENT DOCUMENTS

| 7,089,449 B1 | 8/2006 | Cluff et al. |
| 7,853,825 B2 | 12/2010 | Varadarajan et al. |
| 9,081,792 B1 | 7/2015 | Williams et al. |
| 2014/0019800 A1* | 1/2014 | Erdmann ............ G06F 11/0727 714/6.1 |

FOREIGN PATENT DOCUMENTS

| CN | 1482773 | 4/2010 |
| CN | 105335254 | 2/2016 |
| EP | 0629950 | 10/2001 |
| TW | 200928701 | 7/2009 |
| TW | I344602 | 7/2011 |
| TW | I478065 | 3/2015 |
| TW | I514403 | 12/2015 |

OTHER PUBLICATIONS

"Office Action of Taiwan Counterpart Application", dated Jan. 21, 2019, p. 1-p. 5.

* cited by examiner

Primary Examiner — Christopher S McCarthy
(74) Attorney, Agent, or Firm — JCIPRNET

(57) ABSTRACT

A fault tolerant operating method and an electronic device using the same are provided. The method includes: performing a first procedure by a first executive file installed in the electronic device; when an error occurs to cause the first procedure to abort, sending an aborted notification to a fault tolerant module by an operating system (OS) and obtaining an aborted address information of the first procedure by the fault tolerant module; and sending the aborted address information to the OS by the fault tolerant module, such that the OS calls the first executive file to continue executing the first procedure based on the aborted address information.

12 Claims, 5 Drawing Sheets

METHOD AND ELECTRONIC DEVICE FOR CONTINUING EXECUTING PROCEDURE BEING ABORTED FROM PHYSICAL ADDRESS WHERE ERROR OCCURS

CROSS-REFERENCE TO RELATED APPLICATION

This application claims the priority benefit of Taiwan application serial no. 106120858, filed on Jun. 22, 2017, and Taiwan application serial no. 106106866, filed on Mar. 2, 2017. The entirety of each of the above-mentioned patent applications is hereby incorporated by reference herein and made a part of this specification.

BACKGROUND OF THE INVENTION

Field of the Invention

The invention relates to an electronic device and an operating method thereof, and particularly relates to a fault tolerant operating method and an electronic device using the same.

Description of Related Art

Regarding current recovery methods, regardless of the recovery method developed by a brand factory or built in Microsoft system, once a fatal error occurs, a recovery flow cannot be continually executed, which results in a fact that an operating system cannot be successfully entered. However, in most of the cases, through system re-installation or re-execution of the recovery flow, the above error may not happen again. Therefore, most of the so-called "fatal error" does not have a major impact on the system, so that there is no fault-tolerant recovery mechanism, which is a great bother for the user, and is another rework cost for the manufacturer. Moreover, in a system backup procedure, if a backup failure is occurred at a certain file address, the whole backup flow is required to be re-executed.

SUMMARY OF THE INVENTION

The invention is directed to a fault tolerant operating method and an electronic device using the same, which are adapted to improve execution efficiency of a recovery/backup procedure.

An embodiment of the invention provides a fault tolerant operating method, which is adapted to an electronic device having an operating system. The method includes: performing a first procedure by a first executive file installed in the electronic device; sending an abort notification to a fault tolerant module by the operating system when an error occurs to cause the first procedure to abort, and obtaining abort address information of the first procedure by the fault tolerant module; and sending the abort address information to the operating system by the fault tolerant module, such that the operating system calls the first executive file to continue executing the first procedure based on the abort address information.

Another embodiment of the invention provides an electronic device including a storage device and a processor. The storage device includes an operating system, a fault tolerant module and a first executive file configured to execute a first procedure. The processor is coupled to the storage device and is configured to execute the operating system, the fault tolerant module and the first executive file. When an error occurs to cause the first procedure to abort, the processor sends an abort notification to the fault tolerant module through the operating system, and obtains abort address information of the first procedure through the fault tolerant module. Moreover, the processor sends the abort address information to the operating system through the fault tolerant module, such that the operating system calls the first executive file to continue executing the first procedure based on the abort address information.

According to the above description, the system recovery/backup procedure of the invention has a fault tolerant mechanism, such that it is unnecessary to re-execute the whole recovery/backup procedure due to an execution failure, so as to reduce a rework cost.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
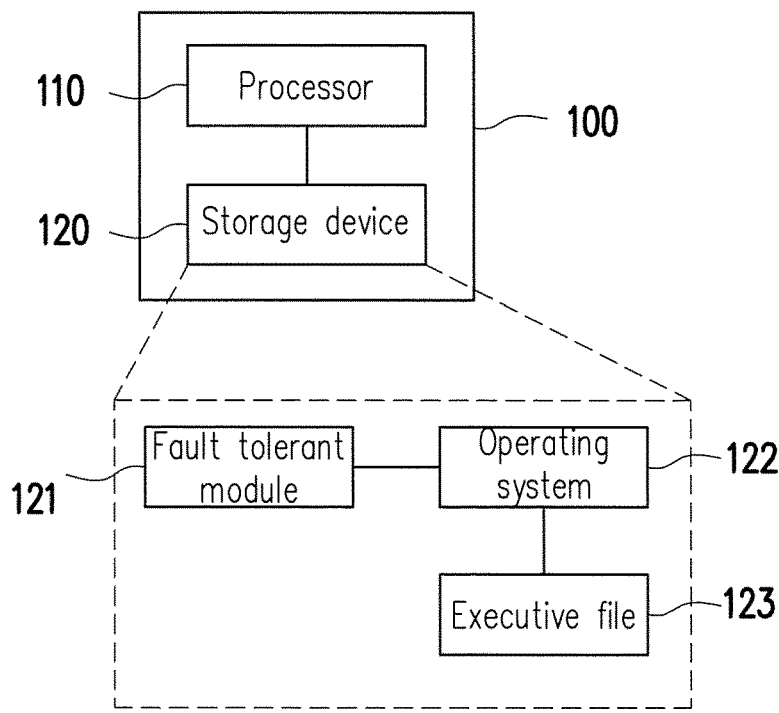
FIG. 1 is a schematic diagram of an electronic device having a recovery/backup fault tolerant mechanism according to an embodiment of the invention.

FIG. 1 is a schematic diagram of an electronic device having a recovery/backup fault tolerant mechanism according to an embodiment of the invention. Referring to FIG. 1, the electronic device 100 includes a processor 110 and a storage device 120. The processor 110 is coupled to the storage device 120.

The processor 110 is, for example, a central processing unit (CPU), a graphic processing unit (GPU), a physics processing unit (PPU), a programmable microprocessor, an embedded control chip, a digital signal processor (DSP), an application specific integrated circuits (ASIC) or other similar devices.

The storage device 120 is, for example, a non-volatile storage unit such as a solid state disk (SSD), a hard disk drive (HDD) or a flash memory, etc. The storage device 120 stores a fault tolerant module 121, an operating system (OS) 122 and an executive file 123 (which is also referred to as a first executive file) configured to execute a predetermined procedure (which is also referred to as a first procedure). For example, the fault tolerant module 121, the OS 122 and the executive file 123 are all installed in the electronic device 100, and the processor 110 may execute the fault tolerant module 121, the OS 122 and the executive file 123 to execute the first procedure. Moreover, the fault tolerant module 121 may be implemented by software, hardware or a combination of software and hardware, which is not limited by the invention.

In an embodiment, the executive file 123 is a recovery executive file, which is used for executing a recovery procedure. In an embodiment, the executive file 123 is a backup executive file, which is used for executing a backup procedure. In an embodiment, the executive file 123 may include both of the recovery executive file and the backup executive file, and the processor 110 may selective execute the recovery procedure or the backup procedure through the executive file 123. Moreover, the fault tolerant module 121 obtains abort address information of the first procedure when the first procedure (which may be the recovery procedure or the backup procedure) is aborted, so as to continue the uncompleted first procedure.

To be specific, in an embodiment, after the first procedure is executed, when an error occurs to cause the first procedure to abort, the OS 122 sends an abort notification to the fault tolerant module 121, and the fault tolerant module 121 obtains the abort address information of the first procedure. Then, the fault tolerant module 121 sends the abort address information to the OS 122, such that the OS 122 calls the executive file 123 to continue executing the first procedure based on the abort address information.

First Embodiment

Figure 2:
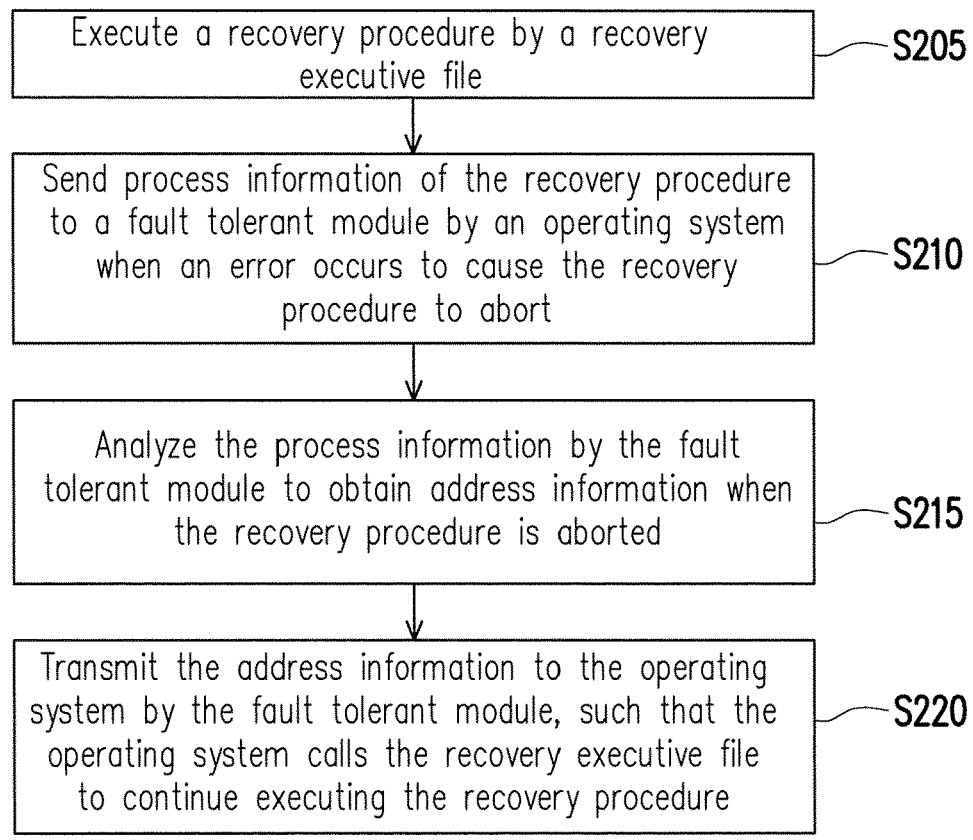
FIG. 2 is a flowchart illustrating a fault tolerant operating method according to an embodiment of the invention.

In the first embodiment, the executive file 123 is the recovery executive file, which is used for executing the recovery procedure. Various steps of a fault tolerant operating method of the first embodiment are described below with reference of the aforementioned electronic device 100. FIG. 2 is a flowchart illustrating a fault tolerant operating method according to an embodiment of the invention, and the fault tolerant operating method of FIG. 2 is also referred to as a recovery method.

Referring to FIG. 1 and FIG. 2, in step S205, the executive file 123 (i.e. the recovery executive file) executes a recovery procedure. The executive file 123 is, for example, recovery-.exe. A user may use an input device such as a mouse, a keyboard, a touch control device, etc., to select and execute the executive file 123, and after the executive file 123 is selected, the executive file 123 is loaded in a system memory to execute the recovery procedure.

Then, in step S210, during an execution process of the recovery procedure, when an error occurs to cause the recovery procedure to abort, the OS 122 sends process information of the recovery procedure to the fault tolerant module 121. To be specific, when the error occurs to cause the recovery procedure to abort, the OS 122 sends an abort notification (which is also referred to as a recovery abort notification) to the fault tolerant module 121. When the fault tolerant module 121 receives the recovery abort notification, the fault tolerant module 121 transmits a request to the OS 122. After the OS 122 receives the request, the OS 122 transmits the process information of the recovery procedure to the fault tolerant module 121.

When the executive file 123 executes the recovery procedure, a flow detail of the recovery procedure is stored in the OS 122. For example, the executive file 123 may store a currently reading virtual memory address and paging content in the OS 122. Therefore, when the recovery procedure has an error to abort, the OS 122 may transmit the process information to the fault tolerant module 121, and the fault tolerant module 121 performs related analysis on the process information.

In step S215, the fault tolerant module 121 analyzes the process information to obtain address information when the recovery procedure is aborted. The address information (i.e. abort address information) includes execution information and physical address information. To be specific, the fault tolerant module 121 obtains the virtual memory address and the paging content from the process information. Then, the fault tolerant module 121 analyzes the virtual memory address to obtain the execution information of the recovery procedure under a user mode at the moment when the error is occurred. Moreover, the fault tolerant module 121 analyzes the paging content to obtain the physical address information of the recovery procedure under a core mode. Namely, the fault tolerant module 121 analyzes the paging content to obtain an execution process of the core mode, and decompiles the execution process of the core mode to obtain the physical address information (i.e. an address of a physical memory that is mapped by the process of the recovery procedure).

The execution information under the user mode records a flow detail of the executive file 123 under the user mode. For example, a currently executed operation under the user mode, a called file, a currently executed function, a function or file to be executed next, etc. The physical address information under the core mode records a flow detail of the executive file under the core mode. For example, a memory address executed when the error occurs under the core mode, and a memory address to be executed next.

Any program executed on the OS 122 may obtain a physical address through a virtual memory and paging technique to complete execution. According to the virtual memory, a process or a thread included in each program, a program behaviour or even a detail flow, a calling procedure, etc. may be learned. Moreover, if the paging content of the process is obtained, a physical memory address or a logical memory address of a process at each moment may be learned.

After the address information corresponding to abortion of the recovery procedure is obtained, in step S220, the fault tolerant module 121 transmits the address information to the OS 122, and the OS 122 calls the executive file 123 to continue executing the (uncompleted) recovery procedure. Namely, the OS 122 calls the executive file 123 to execute a next physical memory address in the backup file content, and the recover procedure is re-started from the physical memory address.

Second Embodiment

Figure 3A:
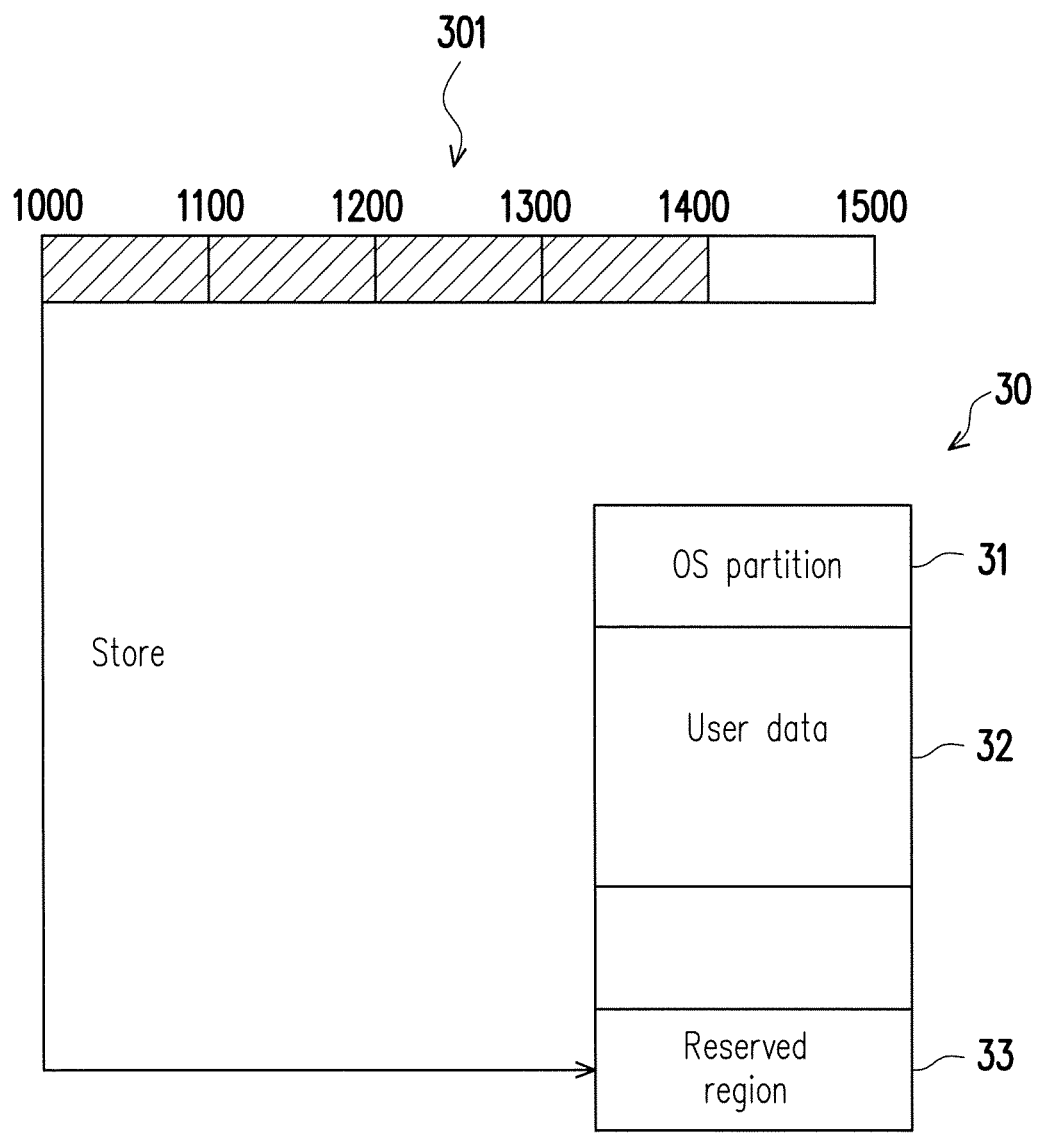
FIG. 3A, FIG. 3B and FIG. 3C are schematic diagrams of a backup procedure according to an embodiment of the invention.
Figure 3B:
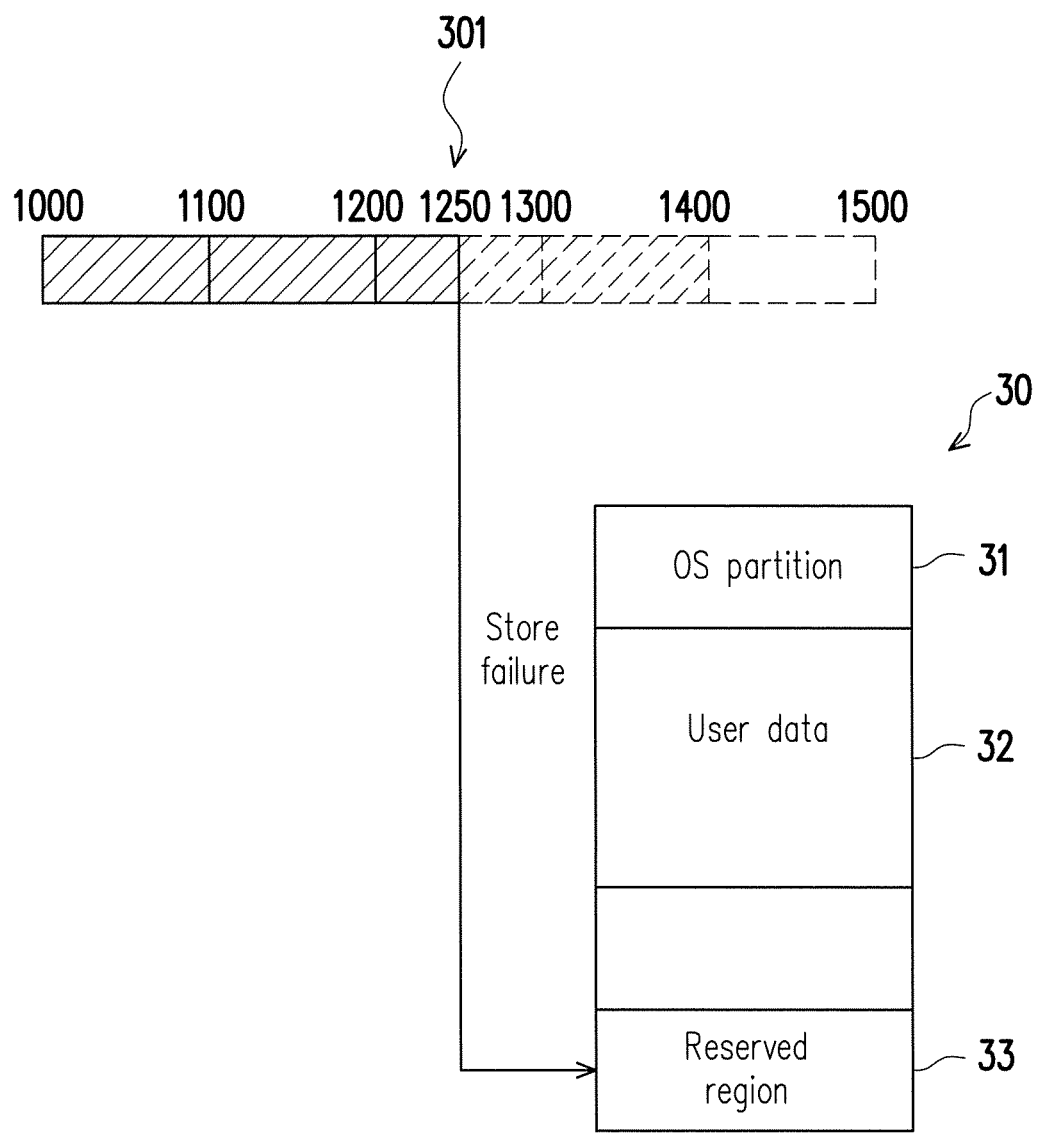
Figure 3C:
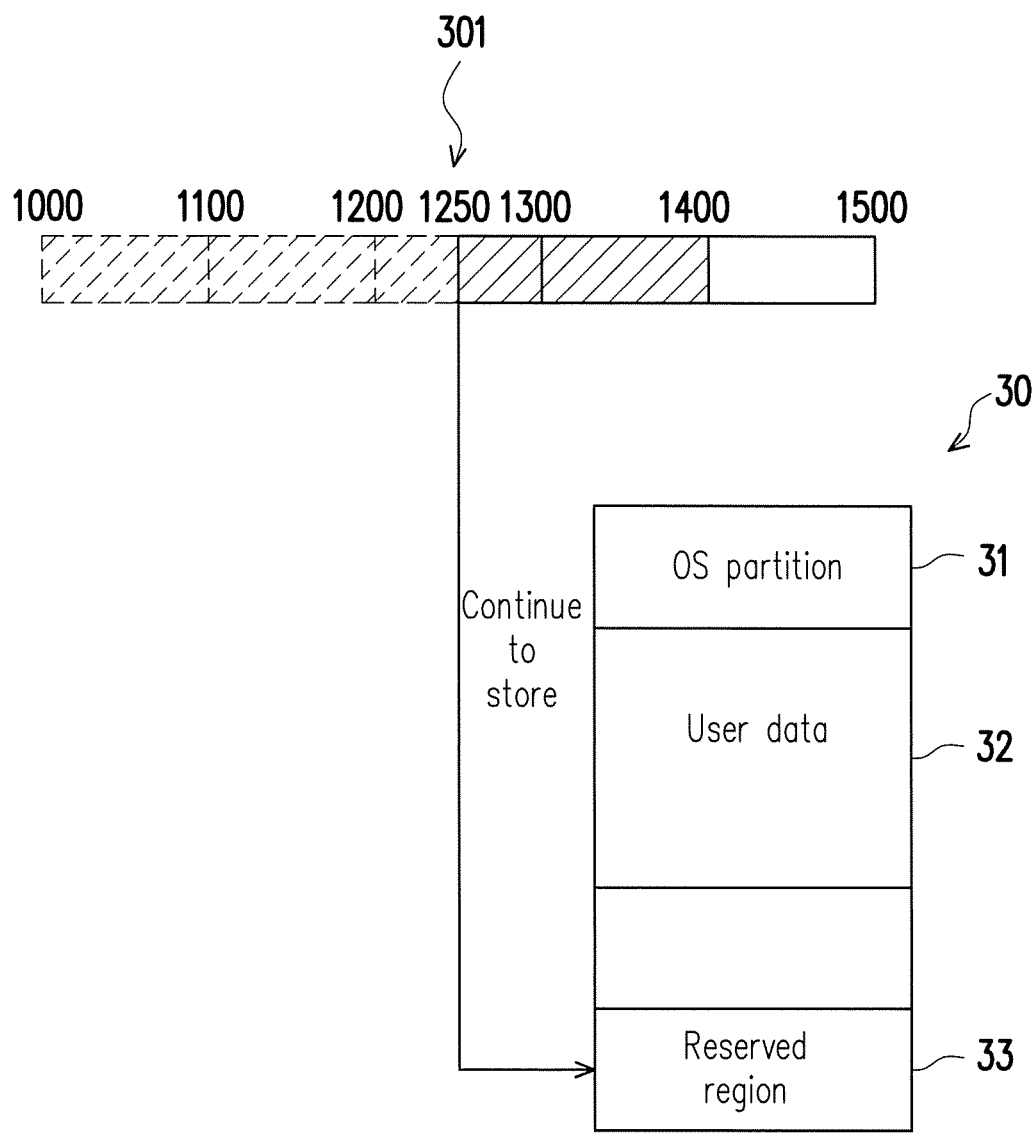
Figure 4:
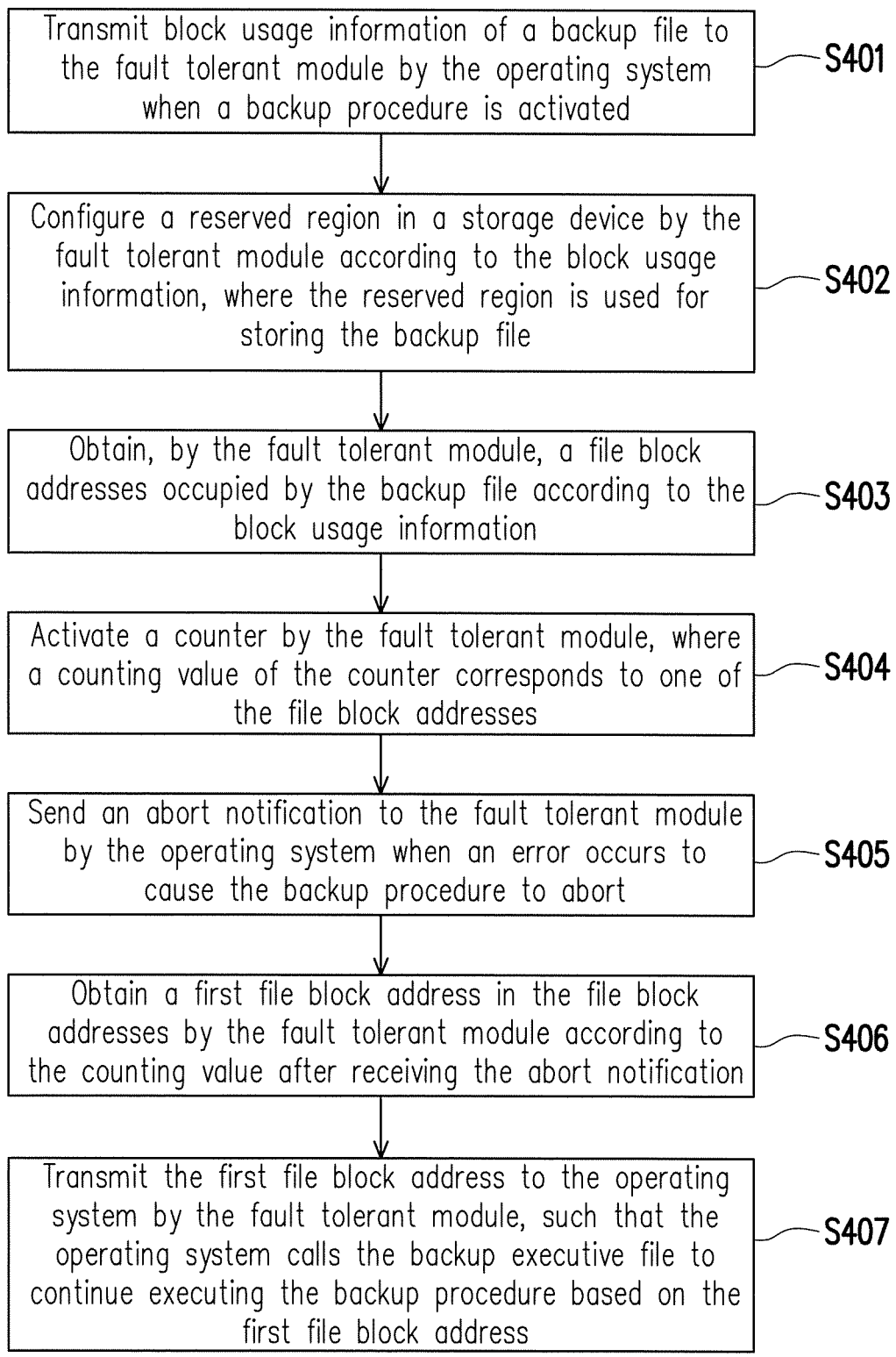
FIG. 4 is a flowchart illustrating a fault tolerant operating method according to another embodiment of the invention.

In the second embodiment, the executive file 123 is a backup file, which is used for executing a backup procedure. Various steps of a fault tolerant operating method of the second embodiment are described below with reference of the aforementioned electronic device 100. FIG. 3A, FIG. 3B and FIG. 3C are schematic diagrams of a backup procedure according to an embodiment of the invention. FIG. 4 is a flowchart illustrating a fault tolerant operating method according to another embodiment of the invention. It should be noted that the fault tolerant operating method of FIG. 4 is also referred to as a backup method.

Referring to FIG. 1, FIG. 3A and FIG. 4, the storage device 120 has a storage space 30. For example, the storage space 30 may be a storage space of a non-volatile storage unit such as an SSD, an HDD, a flash memory, etc., or a combination thereof. The storage space 30 is divided into an operating system (OS) partition 31, a user data region 32. The OS partition 31 is used for storing the OS 122 and files related to running of the OS 122. The user data region 32 is used for storing user data. For example, the user data includes medium file and/or application file, etc., stored under instruction of the user.

It is assumed that a file to be backed up (which is also referred to as a backup file) 301 is a file in the OS partition 31, and physical addresses of the file 301 stored in the OS partition 31 are 1000-1400. For example, one physical address may refer to one physical block address or a physical storage address of any size. In an embodiment, the physical addresses 1000-1400 are also referred to as file block addresses occupied by the file 301. It should be noted that in the present embodiment, the file block addresses occupied by the file 301 are continuous (for example, 1000-1400). However, in another embodiment, the file block addresses occupied by the file 301 may be discontinuous.

In step S401, when the backup procedure for backing up the file 301 is activated, the OS 122 transmits block usage information of the file 301 to the fault tolerant module 121. For example, the block usage information of the file 301 includes related information indicating that the file 301 is stored in the physical addresses 1000-1400. In step S402, the fault tolerant module 121 configures a reserved region 33 in the storage device 120 according to the block usage information of the file 301. The reserved region 33 is used for storing the file 301 through the backup procedure.

Taking FIG. 3A as an example, the fault tolerant module 121 configures the reserved region 33 in the storage space 30 according to the block usage information of the file 301, and the reserved region 33 is used for storing data copied from the physical addresses 1000-1400 in the backup procedure of the file 301. Moreover, a storage capacity of the reserved region 33 is in consistent with a file size of the file 301. For example, the storage capacity of the reserved region 33 is (about) equal to or greater than the file size of the file 301. In this way, in the backup procedure of the file 301, the file 301 is ensured to be integrally stored in the reserved region 33.

In step S403, the fault tolerant module 121 obtains the file block addresses occupied by the file 301 (i.e. the physical addresses 1000-1400) according to the block usage information of the file 301. In an embodiment, the step S403 may be executed before the step S402 or executed together with the step S402, so as to determine the reserved region 33 according to the file block addresses occupied by the file 301. Moreover, the fault tolerant module 121 may also calculate a file size of the file 301 according to the block usage information of the file 301. For example, the file size of the file 301 is (about) equal to a total capacity of the physical addresses 1000-1400.

In step S404, after the backup procedure of the file 301 is started, the fault tolerant module 121 activates a counter. A counting value of the counter corresponds to one of the file block addresses of the file 301. Taking FIG. 3A as an example, the backup procedure of the file 301 starts from the physical address 1000, and sequentially stores the data in the physical addresses 1000-1400 to the reserved region 33. The counting value of the counter is used for estimating which one of the physical addresses 1000-1400 is currently executed by the backup procedure.

In step S405, when an error occurs to cause the backup procedure of the file 301 to abort, the OS 122 sends an abort notification (which is also referred to as a backup abort notification) to the fault tolerant module 121. In step S406, after receiving the abort notification, the fault tolerant module 121 obtains a first file block address in the file block addresses according to the counting value. It should be noted that the first file block address is a file block address corresponding to occurrence of the error. Then, in step S407, the fault tolerant module 121 transmits the first file block address to the OS 122, and the OS 122 calls the executive file 123 to continue executing the backup procedure based on the first file block address.

Taking FIG. 3B and FIG. 3C as an example, it is assumed that when the backup procedure is executed to the physical address 1250 (i.e. the data is read out from the physical address 1250 and stored to the reserved region 33), storage failure is occurred to cause the backup procedure of the file 301 to abort. In this case, according to the counting value of the counter at the moment when the backup procedure is aborted, the fault tolerant module 121 obtains that the backup procedure is accessing the physical address 1250 when the error occurs. Therefore, the fault tolerant module 121 sets the physical address 1250 as the first file block address and transmits the abort address information containing the first file block address to the OS 122. Then, the OS 122 may instruct the executive file 123 to continue executing the uncompleted backup procedure from the physical address 1250, for example, to continue storing the data stored in the physical address 1250-1400 to the reserved region 33.

It should be noted that the various steps of FIG. 2 and FIG. 4 may be implemented by a plurality of program codes or circuits, which is not limited by the invention. Moreover, the embodiments of FIG. 2 and FIG. 4 may be independently used, or used in collaboration, which is not limited by the invention.

In summary, the invention implements a set of tool program or circuit (the fault tolerant module). When the recovery procedure or the backup procedure is aborted due to an error, the fault tolerant module may obtain a certain physical address (or physical memory address) and a next physical address (or a next physical memory address) where the executed recovery/backup file is located at the moment when the procedure is aborted. Then, the OS may call the executive file to reactivate the recovery procedure or the backup procedure from such address, so as to continue executing the uncompleted (remained) recovery/backup procedure. In this way, it is unnecessary to re-execute the whole recovery procedure or backup procedure due to a small part of procedure execution failure, so that execution efficiency of the recovery/backup procedure may be improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A fault tolerant operating method, adapted to an electronic device having an operating system, the fault tolerant operating method comprising:

performing a first procedure by a first executive file installed in the electronic device, wherein the first executive file comprises a recovery executive file, and the first procedure comprises a recovery procedure;

sending an abort notification and process information of the recovery procedure to a fault tolerant module by the operating system when an error occurs to cause the recovery procedure to abort, obtaining a virtual memory address and a paging content from the process information by the fault tolerant module;

analyzing the virtual memory address to obtain execution information of the recovery procedure under a user mode;

analyzing the paging content to obtain physical address information of the recovery procedure under a core mode; and sending abort address information to the operating system by the fault tolerant module, such that the operating system calls the recovery executive file to continue executing the recovery procedure based on the abort address information, wherein the abort address information comprises the execution information and the physical address information.

2. The fault tolerant operating method as claimed in claim 1, wherein the step of sending the abort notification and the process information of the recovery procedure to the fault tolerant module by the operating system comprises:

sending a request to the operating system by the fault tolerant module after the fault tolerant module receives the abort notification; and sending the process information of the recovery procedure to the fault tolerant module after the operating system receives the request.

3. The fault tolerant operating method as claimed in claim 1, wherein the step of analyzing the paging content to obtain the physical address information of the recovery procedure under the core mode comprises:

analyzing the paging content to obtain an execution process of the core mode; and decompiling the execution process of the core mode to obtain the physical address information.

4. The fault tolerant operating method as claimed in claim 1, wherein the first executive file further comprises a backup executive file, the first procedure further comprises a backup procedure, and the fault tolerant operating method further comprises:

sending block usage information of a backup file to the fault tolerant module by the operating system when the backup procedure is activated; and configuring a reserved region in a storage device by the fault tolerant module according to the block usage information, wherein the reserved region is configured to store the backup file through the backup procedure, and a storage capacity of the reserved region is in consistent with a file size of the backup file.

5. The fault tolerant operating method as claimed in claim 4, further comprising:

obtaining at least one file block address occupied by the backup file by the fault tolerant module according to the block usage information; and activating a counter by the fault tolerant module after the backup procedure is activated, wherein a counting value of the counter corresponds to one of the at least one file block address.

6. The fault tolerant operating method as claimed in claim 5, further comprising:

obtaining a first file block address in the at least one file block address by the fault tolerant module according to the counting value of the counter when an error occurs to cause the backup procedure to abort; and sending the first file block address to the operating system by the fault tolerant module, such that the operating system calls the backup executive file to continue executing the backup procedure based on the first file block address.

7. An electronic device, comprising:

a storage device, comprising:
  an operating system;
  a fault tolerant module; and
  a first executive file, configured to execute a first procedure, wherein the first executive file comprises a recovery executive file, and the first procedure comprises a recovery procedure; and a processor, coupled to the storage device, and configured to execute the operating system, the fault tolerant module and the first executive file, wherein the processor sends an abort notification and process information of the recovery procedure to the fault tolerant module through the operating system when an error occurs to cause the recovery procedure to abort, the processor obtains a virtual memory address and a paging content from the process information through the fault tolerant module, the processor analyzes the virtual memory address to obtain execution information of the recovery procedure under a user mode, the processor analyzes the paging content to obtain physical address information of the recovery procedure under a core mode, and the processor sends abort address information to the operating system through the fault tolerant module, such that the operating system calls the recovery executive file to continue executing the recovery procedure based on the abort address information, wherein the abort address information comprises the execution information and the physical address information.

8. The electronic device as claimed in claim 7, wherein the processor further sends a request to the operating system through the fault tolerant module after the fault tolerant module receives the abort notification, and after the operating system receives the request, the processor further sends the process information of the recovery procedure to the fault tolerant module through the operating system.

9. The electronic device as claimed in claim 7, wherein the processor further analyzes the paging content through the fault tolerant module to obtain an execution process of the core mode, and decompiles the execution process of the core mode to obtain the physical address information.

10. The electronic device as claimed in claim 7, wherein the first executive file further comprises a backup executive file, the first procedure further comprises a backup procedure, and when the backup procedure is activated, the processor sends block usage information of a backup file to the fault tolerant module through the operating system, and the processor configures a reserved region in the storage device through the fault tolerant module according to the block usage information, wherein the reserved region is configured to store the backup file through the backup procedure, and a storage capacity of the reserved region is in consistent with a file size of the backup file.

11. The electronic device as claimed in claim 10, wherein the processor further obtains at least one file block address occupied by the backup file through the fault tolerant module according to the block usage information, and the processor activates a counter through the fault tolerant module after the backup procedure is activated, wherein a counting value of the counter corresponds to one of the at least one file block address.

12. The electronic device as claimed in claim 11, wherein the processor further obtains a first file block address in the at least one file block address through the fault tolerant module according to the counting value of the counter when an error occurs to cause the backup procedure to abort, and
the processor further sends the first file block address to the operating system through the fault tolerant module, such that the operating system calls the backup executive file to continue executing the backup procedure based on the first file block address.

* * * * *